United States Patent
Wegner et al.

(10) Patent No.: US 6,997,980 B2
(45) Date of Patent: Feb. 14, 2006

(54) AQUEOUS, EFFECT-PRODUCING COATING MATERIAL, METHOD FOR THE PRODUCTION THEREOF AND USE OF THE SAME

(75) Inventors: Egon Wegner, Veitshöchheim (DE); Frank Jansing, Tauberbischofsheim (DE)

(73) Assignee: BASF Coatings AG, Munster (DE)

( * ) Notice: Subject to any disclaimer, the term of this patent is extended or adjusted under 35 U.S.C. 154(b) by 258 days.

(21) Appl. No.: 10/433,764

(22) PCT Filed: Dec. 20, 2001

(86) PCT No.: PCT/EP01/15174

§ 371 (c)(1),
(2), (4) Date: Jun. 5, 2003

(87) PCT Pub. No.: WO02/053658

PCT Pub. Date: Jul. 11, 2002

(65) Prior Publication Data
US 2004/0030003 A1 Feb. 12, 2004

(30) Foreign Application Priority Data
Jan. 4, 2001 (DE) ................. 101 00 195

(51) Int. Cl.
C09C 1/66 (2006.01)
C09C 1/62 (2006.01)
C09C 1/64 (2006.01)
C09D 5/29 (2006.01)

(52) U.S. Cl. .............. 106/403; 106/404; 106/413; 106/415; 106/417; 523/171; 524/186; 524/236; 524/300; 524/322

(58) Field of Classification Search ........... 523/171; 524/186, 236, 300, 322; 106/403, 404, 413, 106/415, 417
See application file for complete search history.

(56) References Cited

U.S. PATENT DOCUMENTS

| | | | | |
|---|---|---|---|---|
| 2,522,538 | A | * | 9/1950 | Rethwisch et al. .......... 106/404 |
| 4,236,934 | A | * | 12/1980 | Bell ........................ 106/404 |
| 4,484,951 | A | * | 11/1984 | Uchimura et al. .......... 106/404 |
| 4,489,135 | A | | 12/1984 | Drexler et al. ........... 428/423.1 |
| 4,522,655 | A | | 6/1985 | Claassen et al. ............ 106/290 |
| 4,725,317 | A | * | 2/1988 | Wheeler ..................... 106/403 |
| 4,851,460 | A | | 7/1989 | Stranghöner et al. ....... 523/407 |
| 4,880,867 | A | | 11/1989 | Göbel et al. ............... 524/507 |
| 4,914,148 | A | | 4/1990 | Hille et al. ................ 524/507 |
| 4,945,128 | A | | 7/1990 | Hille et al. ................ 524/591 |
| 5,075,372 | A | | 12/1991 | Hille et al. ................ 524/839 |
| 5,236,995 | A | * | 8/1993 | Salatin et al. ............... 524/591 |
| 5,334,420 | A | | 8/1994 | Hartung et al. .......... 427/407.1 |
| 5,342,882 | A | | 8/1994 | Göbel et al. ................ 524/832 |
| 5,368,944 | A | | 11/1994 | Hartung et al. ............. 428/423 |
| 5,370,910 | A | | 12/1994 | Hille et al. .............. 427/407.1 |
| 5,416,136 | A | * | 5/1995 | Konzmann et al. ......... 523/414 |
| 5,418,264 | A | * | 5/1995 | Obloh et al. ................ 523/414 |
| 5,552,496 | A | * | 9/1996 | Vogt-Birnbrich et al. ... 525/440 |
| 5,569,705 | A | | 10/1996 | Vogt-Birnbrich et al. ... 524/591 |
| 5,571,861 | A | | 11/1996 | Klein et al. ................. 524/591 |
| 5,654,391 | A | | 8/1997 | Göbel et al. .................. 528/71 |
| 5,658,617 | A | * | 8/1997 | Gobel et al. ............. 427/372.2 |
| 5,691,425 | A | | 11/1997 | Klein et al. ................. 525/455 |
| 5,760,128 | A | | 6/1998 | Baltus et al. ................ 524/591 |
| 5,869,198 | A | | 2/1999 | Erne et al. .................. 428/626 |
| 5,905,132 | A | | 5/1999 | Wegner et al. ................ 528/45 |
| 6,001,424 | A | | 12/1999 | Lettmann et al. ......... 427/407.1 |
| 6,001,915 | A | | 12/1999 | Schwarte et al. ........... 524/457 |
| 6,221,949 | B1 | | 4/2001 | Gross et al. ................ 524/451 |
| 6,372,875 | B1 | | 4/2002 | Mayer et al. .................. 528/60 |
| 6,448,326 | B1 | | 9/2002 | Mayer et al. ................ 524/507 |

FOREIGN PATENT DOCUMENTS

| | | | | |
|---|---|---|---|---|
| CA | 2073115 | A | * | 1/1993 |
| CA | 2102169 | A | * | 5/1994 |
| CA | 2102170 | A | * | 5/1994 |
| DE | 4110520 | A | * | 10/1992 |
| EP | 0394737 | | | 9/1990 |
| JP | 63234072 | A | * | 9/1988 |

OTHER PUBLICATIONS

JPO abstract for JP 63-234072 (Ishijima et al.).*
Translation of JP 63-234072-A, Ishijima et al. (Sep. 29, 1988).*
English Language Abstract for DE4328092.
English Language Abstract for EP0593454.
English Language Abstract for JP10-120936 (Dec. 5, 1998).
English Language Abstract for EP0297576.
English Language Abstract for DE 4005961.

* cited by examiner

Primary Examiner—Matthew A. Thexton

(57) ABSTRACT

An aqueous effect coating material comprising at least one water soluble or dispersible binder,
at least one effect pigment, and
a neutralized mixture of at least two fatty acids;
process for its preparation, and its use in automotive OEM finishing, automotive refinish, the interior and exterior coating of constructions, the coating of doors, windows and furniture, and also industrial coating, including coil coating, container coating, and the coating of electrical components.

11 Claims, No Drawings

AQUEOUS, EFFECT-PRODUCING COATING MATERIAL, METHOD FOR THE PRODUCTION THEREOF AND USE OF THE SAME

The present invention relates to a novel, aqueous, effect coating material, especially a metallic aqueous basecoat material. The present invention further relates to a process for preparing the novel aqueous effect coating material. The present invention additionally relates to the use of the novel aqueous effect coating material to produce single-coat or multicoat effect coating systems.

Aqueous effect coating materials, in particular metallic aqueous basecoat materials, especially polyurethane-based metallic aqueous basecoat materials, are known, for example, from the patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 and EP 0 817 684 column 5, lines 31 to 45. They are used in particular to produce multicoat effect coating systems by the wet-on-wet technique, in which the metallic aqueous basecoat material is applied to a substrate and the resulting wet film is dried but not cured. The resulting basecoat film is then overcoated with a clearcoat material, after which basecoat film and clearcoat film are cured together. Alternatively, they may be used to produce solid-color topcoats.

The application and the curing of the aqueous effect coating materials may be accompanied by the formation of what are known as clouds, i.e., areas of light/dark shading. These are an indicator of deficiencies in dispersing and/or orienting the effect pigments, especially metal effect pigments, in the finish. However, it is precisely in the case of particularly high-value products having extensive finishes, such as automobiles, for example, that cloudy finishes are fundamentally unacceptable, since paint defects of this kind suggest low quality in the entire product (e.g., the automobile).

Although it is known that the cloudiness may be reduced to a certain extent by adding Aerosil pastes, talc pastes, white pastes or flatting pastes to the aqueous effect coating materials, the addition of such pastes frequently has a deleterious effect on the shade (shade shift) and on the metallic effect (reduction).

It is an object of the present invention to provide a novel aqueous effect coating material from which the disadvantages of the prior art are now absent and which instead gives single-coat and multicoat effect coating systems which exhibit light/dark shading (clouds) either not at all or to a considerably reduced extent relative to the prior art coating systems, and, moreover, leads to an improved metallic effect and improves the gassing stability of the effect pigments. The novel aqueous effect coating materials and the novel single-coat and multicoat effect coating systems produced from them should otherwise continue to have the advantageous properties profile of the known aqueous effect coating materials and of the single-coat and multicoat effect coating systems produced from them, if not indeed exceeding said profile. Moreover, the novel aqueous effect coating materials should be available simply using customary and known starting materials with minimal material modification to the known coating materials, so that they can be prepared, handled, applied and cured in existing equipment.

A further object of the present invention was to find a novel process for preparing aqueous effect coating materials which, with minimal modification of the known processes for preparing such coating materials, provides novel aqueous effect coating materials which are suitable for producing single-coat and multicoat effect coating systems which are entirely or substantially cloud-free.

Accordingly, we have found the novel aqueous effect coating material, comprising at least one water soluble or dispersible binder,
  at least one effect pigment, and
  a neutralized mixture of at least two fatty acids.

In the text below, the novel aqueous effect coating material is referred to as the "coating material of the invention".

Additionally, we have found the novel process for preparing the coating material of the invention, which involves
(I) dispersing the effect pigment or pigments in a mixture comprising
  at least one water miscible organic solvent,
  at least one water soluble or dispersible binder, and
  a neutralized mixture of at least two fatty acids; and then
(II) combining the resulting dispersion (I) with the aqueous solution or dispersion of at least one water soluble or dispersible binder.

In the text below, the novel process for preparing the coating material of the invention is referred to as the "process of the invention".

Further subject matter of the invention will emerge from the description.

The optical effects brought forth by the coating material of the invention are preferably metallic effects and/or dichroic optical effects, but especially metallic effects (cf. Römpp Lexikon Lacke und Druckfarben, Georg Thieme Verlag, 1998, page 176, "Effect pigments" and pages 380 and 381, "Metal oxide-mica pigments" to "Metal pigments").

The coating material of the invention comprises at least one water soluble or dispersible binder.

The binders may be curable physically, thermally, or thermally and with actinic radiation. The latter is referred to by those in the art as dual cure.

In the context of the present invention, the term "physical curing" denotes the curing of a layer of a coating material by film formation through loss of solvent from the coating material, with linking within the coating taking place via looping of the polymer molecules of the binders (regarding the term, cf. Römpp, op. cit., pages 73 and 74, "Binders"). Alternatively, filming takes place by way of the coalescence of binder particles (cf. Römpp, op. cit., pages 274 and 275, "Curing"). Normally, no crosslinking agents are required for this purpose. If desired, the physical curing may be assisted by atmospheric oxygen, by heat, or by exposure to actinic radiation.

Where the binders are thermally curable, they may be thermally externally crosslinking or self-crosslinking, especially externally crosslinking. In the context of the present invention, the term "self-crosslinking" refers to the property of a binder whereby it enters into crosslinking reactions with itself. A prerequisite for this is that the binders already include both kinds of complementary reactive functional groups that are necessary for thermal crosslinking, or reactive functional groups which are able to react "with themselves". Externally crosslinking, on the other hand, is the term used to refer to those binders in which one kind of complementary reactive functional groups is present in the binder and the other kind in a curing or crosslinking agent. For further details, reference is made to Römpp, op. cit., "Curing", pages 274 to 276, especially page 275, bottom.

In the context of the present invention, actinic radiation is electromagnetic radiation, such as near infrared (NIR), visible light, UV radiation or X-rays, especially UV radiation, and corpuscular radiation such as electron beams.

The binders are oligomeric and polymeric resins. By oligomers are meant resins containing at least 2 to 15 monomer units in the molecule. In the context of the present invention, polymers are resins which contain at least 10 repeating monomer units in the molecule. For further details of these terms, reference is made to Römpp, op. cit., page 425, "Oligomers".

Examples of suitable binders are random, alternating and/or block, linear and/or branched and/or comb addition (co)polymers of ethylenically unsaturated monomers, or polyaddition resins and/or polycondensation resins. Regarding these terms, reference is made for further details to Römpp, op. cit., page 457, "Polyaddition" and "Polyaddition resins (polyadducts)", and also pages 463 and 464, "Polycondensates", "Polycondensation" and "Polycondensation resins", and also pages 73 and 74, "Binders".

Examples of suitable addition (co)polymers are (meth) acrylate (co)polymers or partially saponified polyvinyl esters, in particular (meth)acrylate copolymers, especially polyurethane modified (meth)acrylate copolymers.

Examples of suitable polyaddition resins and/or polycondensation resins are polyesters, alkyds, polyurethanes, polylactones, polycarbonates, polyethers, epoxy resins, epoxy resin-amine adducts, polyureas, polyamides, polyimides, polyester-polyurethanes, polyether-polyurethanes or polyester-polyether-polyurethanes, especially polyesters and polyurethanes.

The self-crosslinking thermally curable or dual-cure binders comprise reactive functional groups which are able to enter into crosslinking reactions with groups of their kind or with complementary reactive functional groups. The externally crosslinking thermally curable or dual-curable binders comprise reactive functional groups which are able to enter into crosslinking reactions with complementary reactive functional groups which are present in crosslinking agents. Examples of suitable complementary reactive functional groups for use in accordance with the invention are compiled in the following overview. In the overview, the variable R stands for an acyclic or cyclic aliphatic, an aromatic and/or an aromatic-aliphatic (araliphatic) radical; the variables R' and R" stand for identical or different aliphatic radicals or are linked with one another to form an aliphatic or heteroaliphatic ring.

| Overview: Examples of complementary functional groups | |
|---|---|
| Binder | and crosslinking agent |
| | or |
| Crosslinking agent | and binder |
| —SH | —C(O)—OH |
| —NH$_2$ | —C(O)—O—C(O) |
| —OH | —NCO |
| —O—(CO)—NH—(CO)—NH$_2$ | —NH—C(O)—OR |
| —O—(CO)—NH$_2$ | —CH$_2$—OH |
| >NH | —CH$_2$—O—R |
| | —NH—CH$_2$—O—R |
| | —NH—CH$_2$—OH |
| | —N(—CH$_2$—O—R)$_2$ |
| | —NH—C(O)—CH(—C(O)OR)$_2$ |
| | —NH—C(O)—CH(—C(O)OR)(—C(O)—R) |
| | —NH—C(O)—NR'R" |
| | >Si(OR)$_2$ |
| | 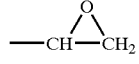 |
| | 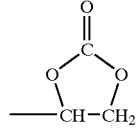 |
| | 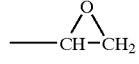 |
| | —C(O)—N(CH$_2$—CH$_2$—OH)$_2$ |

The selection of the respective complementary groups is guided on the one hand by the consideration that they must not enter into any unwanted reactions, in particular no premature crosslinking, during the preparation, storage and application of the coating materials of the invention, and/or, if appropriate, must not disrupt or inhibit the curing with actinic radiation, and on the other by the temperature range within which crosslinking is to take place.

In the case of the coating materials of the invention, it is preferred to employ crosslinking temperatures from 60 to 180° C.

In this context, in the case of multicomponent systems, especially two-component systems, in which the binders are stored separately from the crosslinking agents until shortly before application, crosslinking temperatures of from 60 to 100° C. are employed. It is preferred to employ binders containing thio, hydroxyl, primary and secondary amino, and also imino groups, and crosslinking agents containing free isocyanate groups.

In the case of the one-component systems, in which the binders are present with the crosslinking agents, it is preferred to employ crosslinking temperatures above 100° C.

Use is therefore made preferably of binders containing thio, hydroxyl, N-methylolamino, N-alkoxymethylamino, imino, carbamate, allophanate, epoxy or carboxyl groups, preferably hydroxyl or epoxy groups, in particular epoxy groups, on the one hand and, preferably, of crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, hydroxyl, beta-hydroxyalkylamide, unblocked isocyanate, urethane or alkoxymethylamino groups, on the other.

In the case of self-crosslinking binders, use is made in particular of methylol, methylol ether and/or N-alkoxymethylamino groups.

The binders contain functional groups which render them dispersible in water and/or soluble in water. These are alternatively (f1) functional groups which can be converted into cations by neutralizing agents and/or quaternizing agents, or
(f2) functional groups which can be converted into anions by neutralizing agents, and/or anionic groups, and/or
(f3) nonionic hydrophilic groups, especially poly(alkylene ether) groups.

Examples of suitable functional groups (f1) which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (f1) are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups (f2) which can be converted into anions by neutralizing agents are carboxylic, sulfonic or phosphonic acid groups, especially carboxylic acid groups.

Examples of suitable anionic groups (f2) are carboxylate, sulfonate or phosphonate groups, especially carboxylate groups.

Examples of suitable neutralizing agents for functional groups (f1) convertible into cations are inorganic and organic acids such as sulfuric acid, hydrochloric acid, phosphoric acid, formic acid, acetic acid, lactic acid, dimethylolpropionic acid or citric acid.

Examples of suitable neutralizing agents for functional groups (f2) convertible into anions are ammonia, amines such as trimethylamine, triethylamine, tributylamine, or amino alcohols, dibutylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine, for example. Preferred neutralizing agents used are dimethylethanolamine, dibutylamine and/or triethylamine.

The complementary reactive functional groups described above may be incorporated into the binders by the customary and known methods of polymer chemistry. This can be done, for example, by incorporating monomers which carry the corresponding reactive functional groups, and/or by means of polymer-analogous reactions.

Examples of suitable olefinically unsaturated monomers containing reactive functional groups by means of which these groups may be introduced into the (meth)acrylate copolymers are (a1) monomers which carry per molecule at least one hydroxyl, amino, alkoxymethylamino, carbamate, allophanate or imino group, such as hydroxyalkyl esters of acrylic acid, methacrylic acid or another alpha,beta-olefinically unsaturated carboxylic acid which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone, for example, and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, especially a Versatic® acid, or, instead of the reaction product, an equivalent amount of acrylic acid and/or methacrylic acid which subsequently, during or after the polymerization reaction, is reacted with the glycidyl ester of an alpha-branched monocarboxylic acid having 5 to 18 carbon atoms per molecule, especially a Versatic® acid;

aminoethyl acrylate, aminoethyl methacrylate, allylamine or N-methyliminoethyl acrylate;

N,N-di(methoxymethyl)aminoethyl acrylate or methacrylate or N,N-di(butoxymethyl)aminopropyl acrylate or methacrylate;

(meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;

acryloyloxy- or methacryloyloxyethyl, -propyl or -butyl carbamate or allophanate; further examples of suitable monomers containing carbamate groups are described in the patents U.S. Pat. Nos. 3,479,328, 3,674,838, 4,126,747, 4,279,833 or 4,340,497;

(a2) monomers which carry per molecule at least one acid group, such as acrylic acid, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers);

(a3) monomers containing epoxy groups, such as the glycidyl ester of acrylic acid, methacrylic acid, ethacrylic acid, crotonic acid, maleic acid, fumaric acid or itaconic acid, or allyl glycidyl ether.

Monomers of the type described above that are of relatively high functionality are generally used in minor amounts. In the context of the present invention, minor amounts of monomers of relatively high functionality are those amounts which do not lead to crosslinking or gelling of the copolymers, especially the (meth)acrylate copolymers, unless the specific intention is to prepare crosslinked polymeric microparticles.

Examples of suitable monomers for introducing reactive functional groups into polyesters or polyester-polyurethanes are 2,2-dimethylolethyl- or -propylamine blocked with a ketone, the resulting ketoxime group being hydrolyzed again after the incorporation; or compounds containing two hydroxyl groups or two primary and/or secondary amino groups and also at least one acid group, in particular at least one carboxyl group and/or at least one sulfonic acid group, such as dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylolpentanoic acid, $\alpha,\delta$-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the chloroformate-functional resins with ammonia and/or primary and/or secondary amines to give resins containing carbamate groups. Further examples of suitable methods of this kind are known from the patents U.S. Pat. Nos. 4,758,632 A, 4,301,257 A or 2,979,514 A.

The dual-cure binders further comprise on average at least one, preferably at least two, group(s) containing per molecule at least one bond which can be activated with actinic radiation.

In the context of the present invention, a bond which can be activated with actinic radiation is a bond which on exposure to actinic radiation becomes reactive and, with other activated bonds of this kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the group which is preferred in accordance with the invention contains one double bond or two, three or four double bonds. If more than one double bond is used, the double bonds may be conjugated. In accordance with the invention, however, it is of advantage if the double bonds are present in isolation, in particular each being present terminally, in the group in question. It is of particular advantage in accordance with the invention to use two double bonds, or especially one double bond.

If on average per molecule more than one group which can be activated with actinic radiation is employed, the groups are structurally different from one another or are of the same structure.

If they are structurally different from one another, this means in the context of the present invention that use is made of two, three, four or more, but especially two, groups which can be activated with actinic radiation, which are derived from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially acrylate groups.

Preferably, the groups are attached to the respective parent structures of the binders via urethane, urea, allophanate, ester, ether and/or amide groups, but in particular by ester groups. Normally, this occurs as a result of customary and known polymer-analogous reactions such as, for instance, the reaction of lateral glycidyl groups with the olefinically unsaturated monomers described above that contain an acid group, of lateral hydroxyl groups with the halides of these monomers, of hydroxyl groups with isocyanates containing double bonds such as vinyl isocyanate, methacryloyl isocyanate and/or 1-(1-isocyanato-1-methylethyl)-3-(1-methylethenyl)benzene (TMI® from CYTEC), or of isocyanate groups with the hydroxyl-containing monomers described above.

In the case of the polyurethanes and of the polyesters, the groups may be introduced with the aid of compounds containing at least one, especially one, of the above-described isocyanate-reactive or acid-reactive functional groups and at least one, especially one, bond which can be activated with actinic radiation. Examples of suitable compounds of this kind are 2-hydroxyethyl, 2-hydroxypropyl, 3-hydroxypropyl, 3-hydroxybutyl, 4-hydroxybutyl, bis(hydroxy-methyl) cyclohexane, neopentyl glycol, diethylene glycol, dipropylene glycol, dibutylene glycol or triethylene glycol acrylate, methacrylate, ethacrylate, crotonate, cinnamate, vinyl ether, allyl ether, dicyclopentadienyl ether, norbornenyl ether, isopropenyl ether, isopropenyl ether or butenyl ether;

trimethylolpropane mono-, glycerol mono-,trimethylolethane mono-, pentaerythritol mono-,homopentaerythritol mono-, pentaerythritol di-,homopentaerythritol di-, trimethylolpropane di-, glycerol di-, trimethylolethane di-,pentaerythritol tri-, or homopentaerythritol tri-acrylate, -methacrylate, -ethacrylate, -crotonate, -cinnamate, -vinyl ether, -allyl ether, -dicyclopentadienyl ether, -norbornenyl ether, -isoprenyl ether, -isopropenyl ether or -butenyl ether; or reaction products of cyclic esters, such as epsilon-caprolactone, for example, and the hydroxyl-containing monomers described above; or 2-aminoethyl (meth)acrylate and/or 3-aminopropyl (meth)acrylate.

The binders described above are customary and known compounds and are described in detail, for example, in the patent applications EP 0 089 497 A1, EP 0 256 540 A1, EP 0 260 447 A1, EP 0 297 576 A1, WO 96/12747, EP 0 523

610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 817 684 column 5 lines 31 to 45, DE 44 37 535 A1, page 7 line 8 to page 8 line 49, EP 0 787 195 A1, DE 40 05 961 A1, DE 41 10 520 A1, EP 0 752 455 B1, DE 198 55 455 B1, DE 199 488 121 A1, DE 198 469 171 A1, EP 0 788 523 B1 or WO 95/12626.

The amount of the binders described above and crosslinking agents described below in the coating material of the invention may vary very widely. Based in each case on the solids content of the coating material of the invention, the amount is preferably from 10 to 90, more preferably from 15 to 80, with particular preference from 20 to 80, with very particular preference from 25 to 80, and in particular from 30 to 80% by weight.

Moreover, the coating material of the invention comprises at least one effect pigment.

Examples of suitable effect pigments are metallic effect pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, platelet-shaped effect pigments based on iron oxide with a shade from pink to brownish red, liquid-crystalline effect pigments or fluorescent pigments (daylight fluorescent pigments) such as bis(azomethine) pigments. For further details, reference is made to Römpp, op. cit., page 176, "Effect pigments" and pages 380 and 381, "Metal oxide-mica pigments" to "Metal pigments" and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. Nos. 4,828,826 A and 5,244,649 A.

Preference is given to the use of metallic effect pigments, especially aluminum effect pigments (cf. Römpp, op. cit., pages 24 and 25, "Aluminum pigments").

The aluminum effect pigments are leafing pigments (cf. Römpp, op. cit., page 351, "Leafing pigments") or non-leafing pigments (cf. Römpp, op. cit., page 412, "Non-leafing pigments"). They are platelet-shaped and of substantially circular form (silver dollar type) or of substantially elongate form (cornflake type).

The amount of effect pigment or effect pigments in the coating material of the invention may vary very widely and is guided firstly by the hiding power of the effect pigment and by the intensity of the target optical effect. Based on its solids content, the coating material of the invention preferably contains from 0.1 to 50, more preferably from 0.5 to 40, with particular preference from 1 to 40, with very particular preference from 1.5 to 35, and in particular from 2 to 30% by weight of effect pigment or effect pigments.

The coating material of the invention further comprises a neutralized mixture of at least two fatty acids. They are preferably selected from the group consisting of fatty acids having 6 to 30 carbon atoms in the molecule. Examples of suitable fatty acids are caproic acid, enanthic acid, caprylic acid, pelargonic acid, capric acid, undecylic acid, lauric acid, inyristic acid, palmitic acid, stearic acid, oleic acid, elaidic acid, araclaidic acid, behenic acid, lignoceric acid, cerotic acid, and melissic acid.

The neutralizing agent used comprises at least one base selected from the group consisting of primary, secondary and tertiary, aromatic, aliphatic and cycloaliphatic monoamines or polyamines, amino alcohols, and ammonia. Examples of suitable neutralizing agents are those described above for functional groups (f2) which can be converted into anions. They are preferably used in excess. It is preferred to use from 0.7 to 2, in particular from 1.1 to 1.5, equivalents of base per equivalent of acid. The coating material of the invention preferably comprises the neutralized fatty acid mixture in an amount, based on the effect pigment, of from 0.5 to 10, more preferably from 0.8 to 8, with particular preference from 1 to 6, with very particular preference from 1.2 to 5, and in particular from 1.4 to 4% by weight.

Moreover, the coating material of the invention may comprise customary and known color pigments, electrically conductive or magnetically shielding pigments, soluble dyes and/or fillers.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments; benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, reference is made to Römpp, op. cit., pages 180 and 181, "Iron blue pigments" to "Black iron oxide", pages 451 to 453, "Pigments" to "Pigment volume concentration", page 563, "Thioindigo pigments", page 567, "Titanium dioxide pigments", pages 400 and 467, "Naturally occurring pigments", page 459, "Polycyclic pigments", page 52 "Azomethine pigments", "Azo pigments", and page 379, "Metal complex pigments".

Examples of suitable electrically conductive pigments are titanium dioxide/tin oxide pigments.

Examples of suitable magnetically shielding pigments are pigments based on iron oxides or chromium dioxide.

Suitable soluble organic dyes are lightfast organic dyes having little or no tendency to migrate from the coating materials of the invention or from the coatings produced from them. The migration tendency can be estimated by the skilled worked on the basis of his or her general knowledge in the art and/or determined with the aid of simple preliminary rangefinding experiments, as part of tinting tests, for example.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, reference is made to Römpp, op. cit., pages 250 ff, "Fillers".

It may be of advantage to use mixtures of platelet-shaped inorganic fillers such as talc or mica and nonplatelet-shaped inorganic fillers such as chalk, dolomite, calcium sulfates or barium sulfate, since by this means it is possible effectively to set the viscosity and the rheology.

The pigments, dyes and fillers described above may be present in a finely divided, nonhiding form.

The coating material of the invention may additionally comprise additives such as water miscible organic solvents, water immiscible or sparingly miscible solvents, nanoparticles, reactive diluents curable thermally or with actinic radiation, the organic solvents described above which are miscible with water and/or only sparingly miscible with water, UV absorbers, light stabilizers, free-radical scavengers, thermolabile free-radical initiators, photoinitiators and photocoinitiators, crosslinking agents, thermal crosslinking catalysts, devolatilizers, slip additives, polymerization inhibitors, defoamers, emulsifiers, wetting agents, dispersants, adhesion promoters, leveling agents, film forming auxiliaries, rheology control additives (thickeners), flame retardants, siccatives, dryers, antiskinning agents, corrosion inhibitors, waxes and/or flatting agents.

In the context of the present invention, water miscible organic solvents are typical paint solvents which are miscible in any proportion with water, such as ethylene glycol, propylene glycol, butyl glycol and the methyl, ethyl or propyl ethers thereof, ketones such as acetone or diacetone alcohol, cyclic ethers such as tetrahydrofuran or dioxane, or amides such as N,N-dimethylformamide or N-methylpyrrolidone (cf. Paints Coatings and Solvents, edited by Dieter Stoye and Werner Freitag, second edition, Wiley-VCH, Weinheim and New York, 1998, pages 329 and 330).

The organic solvents which are immiscible with water or sparingly miscible with water accommodate preferably less than 10, more preferably less than 9, and in particular less than 8% by weight of water at 20° C., based on water and solvent. Conversely, water accommodates preferably less than 6, more preferably less than 5, and in particular less than 4% by weight, at 20° C., based on water and solvent. Examples of suitable organic solvents immiscible with water or sparingly miscible with water are ketones such as methyl isobutyl ketone, diisobutyl ketone, cyclohexanone or trimethylcyclohexanone, ethers as dibutyl ether, esters such as isopropyl acetate, butyl acetate, ethyl glycol acetate or butyl glycol acetate, or higher alcohols such as hexanol, cyclohexanol, trimethylcyclohexanol or 2-ethyl-1-hexanol (isooctanol) (cf. Paints Coatings and Solvents, edited by Dieter Stoye and Werner Freitag, second edition, Wiley-VCH, Weinheim and New York, 1998, pages 329 and 330).

Suitable nanoparticles are in particular those based on silicon dioxide, aluminum oxide and zirconium oxide having a particle size <50 nm which have no flatting effect. Examples of suitable nanoparticles based on silicon dioxide are pyrogenic silicas, which are sold under the trade name Aerosil® VP8200, VP721 or R972 by Degussa or under the trade name Cab 0 Sil® TS 610, CT 1110F. or CT 1110G by CABOT. In general, these nanoparticles are sold in the form of dispersions in monomers curable with actinic radiation, such as the reactive diluents described below. Examples of suitable monomers which are especially suitable for the present end use are alkoxylated pentaerythritol tetraacrylate or triacrylate, ditrimethylolpropane tetraacrylate or triacrylate, dineopentyl glycol diacrylate, trimethylolpropane triacrylate, trishydroxyethyl isocyanurate triacrylate, dipentaerythritol pentaacrylate or hexaacrylate, or hexanediol diacrylate. In general, these dispersions contain the nanoparticles in an amount, based in each case on the dispersions, of from 10 to 80% by weight, preferably from 15 to 70% by weight, with particular preference from 20 to 60% by weight, and in particular from 25 to 50% by weight. An example of an especially suitable dispersion of nanoparticles is the dispersion sold under the trade name High Link® OG 103-31 by Clariant Hoechst.

Examples of suitable thermally curable reactive diluents are positionally isomeric diethyloctanediols or hydroxyl-containing hyperbranched compounds or dendrimers, as described for example in the German patent applications DE 198 05 421 A1, DE 198 09 643 A1 or DE 198 40 405 A1.

Examples of suitable reactive diluents curable with actinic radiation are those described in Römpp, op. cit., on page 491 under the entry "Reactive diluents" or in column 7 lines 1 to 26 of DE 198 18 715 A1, or reactive diluents containing in the molecule at least 5, in particular 5, bonds which can be activated with actinic radiation, such as dipentaerythritol pentaacrylate, for example.

Examples of suitable thermally labile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles, or benzpinacol silyl ethers.

Examples of suitable crosslinking catalysts are dibutyltin dilaurate, dibutyltin dioleate, lithium decanoate, zinc octoate or bismuth salts such as bismuth lactate or bismuth dimethylolpropionate.

Examples of suitable photoinitiators and coinitiators are described in Römpp, op. cit., pages 444 to 446.

Examples of suitable crosslinking agents, as are used in multicomponent systems and are normally added subsequently to the coating material of the invention, are polyisocyanates containing on average at least 2.0, preferably more than 2.0, and in particular more than 3.0, isocyanate groups per molecule, such as diisocyanates such as isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanatoeth-1-yl)cyclohexane, 1-isocyanato-2-(4-isocyanatobut-1-yl)-cyclohexane, 1,2-di-isocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimeric fatty acids, as sold under the commercial designation DDI 1410 by the company Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)

cyclohexane, 1,2-, 1,4- or 1,3-bis(4-isocyanatobut-1-yl)cyclohexane or liquid bis(4-isocyanatocyclohexyl) methane with a trans/trans content of up to 30% by weight, preferably 25% by weight and in particular 20% by weight, as described in patent applications DE 44 14 032 A1, GB 1220717 A1, DE 16 18 795 A1 and DE 17 93 785 A1, preferably isophorone diisocyanate, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane or HDI, especially HDI;

polyisocyanates containing isocyanurate, biuret, allophanate, iminooxadiazinedione, urethane, urea, carbodiimide and/or uretdione groups, which are prepared in a customary and known manner from the diisocyanates described above; examples of suitable preparation techniques and polyisocyanates are known, for example, from the patents CA 2,163,591 A, U.S. Pat. Nos. 4,419,513 A, 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. Nos. 5,258,482 A, 5,290,902 A, EP 0 649 806 A1, DE 42 29 183 A1 and EP 0 531 820 A1; or dual-cure polyisocyanates, which are prepared from the above-described polyisocyanates and the above-described compounds containing at least one, especially one, of the above-described isocyanate-reactive or acid-reactive functional groups and at least one, especially one, bond which can be activated with actinic radiation (cf., e.g., the European patent application EP 0 928 800 A1).

Examples of suitable crosslinking agents as used in one-component systems are amino resins, as described for example in Römpp, op. cit., page 29, "Amino resins", in the textbook "Lackadditive" [Additives for Coatings] by Johan Bieleman, Wiley-VCH, Weinheim, New York, 1998, pages 242 ff., in the book "Paints, Coatings and Solvents", second, completely revised edition, D. Stoye and W. Freitag (eds.), Wiley-VCH, Weinheim, New York, 1998, pages 80 ff., in the patents U.S. Pat. No. 4,710,542 A and EP 0 245 700 A1, and in the article by B. Singh and coworkers, "Carbamylmethylated Melamines, Novel Crosslinkers for the Coatings Industry" in Advanced Organic Coatings Science and Technology Series, 1991, Volume 13, pages 193 to 207; carboxyl-containing compounds or resins, as described for example in the patent DE 196 52 813 A1; resins or compounds containing epoxide groups, as described for example in the patents EP 0 299 420 A1, DE 22 14 650 B1, DE 27 49 576 B1, U.S. Pat. Nos. 4,091,048 A and 3,781,379 A; blocked polyisocyanates, as described for example in the patents U.S. Pat. No. 4,444,954 A, DE 196 17 086 A1, DE 196 31 269 A1, EP 0 004 571 A1 and EP 0 582 051 A1; and/or tris(alkoxycarbonylamino)triazines as described in the patents U.S. Pat. Nos. 4,939,213 A, 5,084,541 A, 5,288,865 A and EP 0 604 922 A1.

Examples of suitable devolatilizers are diazadicycloundecane and benzoin.

Examples of suitable emulsifiers are nonionic emulsifiers, such as alkoxylated alkanols, polyols, phenols and alkylphenols, or anionic emulsifiers such as alkali metal salts or ammonium salts of alkanecarboxylic acids, alkanesulfonic acids, and sulfo acids of alkoxylated alkanols, polyols, phenols and alkylphenols.

Examples of suitable wetting agents are siloxanes, fluorine compounds, carboxylic monoesters, phosphoric esters, polyacrylic acids and their copolymers, or polyurethanes.

An example of a suitable adhesion promoter is tricyclodecanedimethanol.

Examples of suitable film-forming auxiliaries are cellulose derivatives such as cellulose acetobutyrate (CAB).

Examples of suitable rheology control additives (thickeners) are those known from the patent applications WO 94/22968, EP 0 276 501 A1, EP 0 249 201 A1 and WO 97/12945; crosslinked polymeric microparticles, as disclosed for example in EP 0 008 127 A1; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives or polyacrylates; or polyurethane-based associative thickeners, as described in Römpp, op. cit., "Thickeners", pages 599 to 600, and in the textbook "Lackadditive" by Johan Bieleman, Wiley-VCH, Weinheim, New York, 1998, pages 51 to 59 and 65; in particular, combinations of ionic and nonionic thickeners, as described in the patent application DE 198 41 842 A1 for establishing pseudoplasticity; or the combination of associative thickeners based on polyurethane and wetting agents based on polyurethane, as is described in detail in the German patent application DE 198 35 296 A1.

An example of a suitable flatting agent is magnesium stearate.

Further examples of the above-listed additives and also examples of suitable UV absorbers, free-radical scavengers, leveling agents, flame retardants, siccatives, dryers, antiskinning agents, corrosion inhibitors and waxes (B) are described in detail in the textbook "Lackadditive" by Johan Bieleman, Wiley-VCH, Weinheim, New York, 1998.

The coating material of the invention may be prepared by any of the processes known and customary in the coatings field. For example, the above-described starting products may be combined individually, in succession or all at once, in an appropriate mixing apparatus, such as stirred vessels, dissolvers or Ultraturrax, and mixed with one another. Mixing is carried out sufficiently gently that the effect pigments used in each case are not damaged. It is, however, of advantage to prepare the coating material of the invention using the process of the invention.

In a first step of the process of the invention, the effect pigment or pigments is or are dispersed in a mixture comprising at least one water miscible organic solvent, at least one water soluble or dispersible binder, and a neutralized mixture of at least two fatty acids.

Examples of suitable water soluble or dispersible binders are those described above. It is preferred to use water soluble or dispersible polyesters.

Suitable effect pigments, water miscible organic solvents, and neutralized fatty acid mixtures are those described above.

In a second step of the process, the dispersion (I) resulting from the first step is combined with a dispersion (II). The dispersion (II) comprises at least one of the above-described water soluble or dispersible binders. Furthermore, the dispersion (II) may comprise the above-described pigments, fillers, and additives.

The composition and amounts used of dispersions (I) and (II) are such as to give the coating materials of the invention described above.

The preparation of the dispersions (I) and (II) and their mixing have no special features in terms of methods but instead take place as described above.

The coating material of the invention is suitable for numerous applications in the fields of automotive OEM finishing, automotive refinish, the interior and exterior coating of constructions, the coating of furniture, doors and windows, and also industrial coating, including container coating and coil coating and the coating of electrical components. The coating material of the invention may be used as a primer-surfacer, aqueous basecoat material or solid-color topcoat material, but in particular as an aqueous basecoat material. As an aqueous basecoat material, it is used to produce multicoat effect coating systems of the invention in accordance with the wet-on-wet technique.

Suitable substrates comprise metals, plastics, wood, ceramic, stone, textile, fiber composites, leather, glass, glass fibers, glass wool, rockwool, mineral-bound and resin-bound building materials, such as plasterboard and cement slabs or roof tiles, and also assemblies of these materials.

In the case of electrically conductive substrates, it is possible to use primers which are produced in a customary and known manner from electrodeposition coating materials. Both anodic and cathodic electrodeposition coating materials are suitable for this purpose, but especially cathodic coating materials.

On the electrocoat there may also be an antistonechip primer coat or primer-surfacer coat produced from a customary and known primer-surfacer.

It is also possible to coat primed or unprimed plastic parts made, for example, from ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728T1). Unfunctionalized and/or nonpolar substrate surfaces may be subjected prior to coating in a known manner to a pretreatment, such as by plasma or by flaming, or may be provided with a primer.

Suitable clearcoat materials for the wet-on-wet technique are one-component or multicomponent clearcoat materials, powder clearcoat materials, powder slurry clearcoat materials, UV curable clearcoat materials or sealers, as known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 or WO 92/22615, U.S. Pat. Nos. 5,474,811 A1, 5,356,669 A1 or 5,605,965 A1, DE 42 22 194 A1, the product information bulletin from BASF Lacke+Farben AG, "Pulverlacke" [Powder coating materials], 1990, the BASF Coatings AG brochure "Pulverlacke, Pulverlacke für industrielle Anwendungen" [Powder coating materials, powder coatings for industrial applications], January 2000, U.S. Pat. No. 4,268, 542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. Nos. 5,824,373 A1, 4,675,234 A1, 4,634,602 A1, 4,424,252 A1, 4,208,313 A1, 4,163,810 A1, 4,129,488 A1, 4,064,161 A1, 3,974,303 A1, EP 0 844 286 A1, DE 43 03 570 A1, DE 34 07 087 A1, DE 40 11 045 A1, DE 40 25 215 A1, DE 38 28 098 A1, DE 40 20 316 A1 or DE 41 22 743 A1.

The coating materials of the invention may be applied by any customary application method, such as spraying, knife coating, brushing, flow coating, dipping, impregnating, trickling or rolling, for example. The substrate to be coated may itself be at rest, with the application equipment or unit being moved. Alternatively, the substrate to be coated, especially a coil, may be moved, with the application unit being at rest relative to the substrate or being moved in an appropriate manner.

It is preferred to employ spray application methods, such as compressed air spraying, airless spraying, high-speed rotation, electrostatic spray application (ESTA), alone or together with hot spray application such as hot air spraying, for example. Application may be made at temperatures of max. 70 to 80° C., so that appropriate application viscosities are achieved without the brief thermal exposure causing any change in or damage to the coating material of the invention or its overspray, which may be intended for recycling. For instance, hot spraying may be configured such that the coating material is heated only very briefly in the spray nozzle or shortly before the spray nozzle.

The spray booth used for application may, for example, be operated with a circulation system, which may be temperature-controllable, and which is operated with an appropriate absorption medium for the overspray, an example of such medium being the same coating material that is being applied in each case.

Where the coating material of the invention is curable thermally and with actinic radiation, application is preferably conducted under illumination with visible light of a wavelength of more than 550 nm or in the absence of light. By this means, material alteration or damage to the dual-cure coating material of the invention and to the overspray is avoided.

In general, for the production of the multicoat effect coating systems of the invention, the aqueous basecoat film of the invention and the clearcoat film are applied in a wet film thickness such that curing thereof results in coats having the thicknesses that are advantageous and necessary for their functions; in the case of the basecoat, these thicknesses are from 5 to 50, preferably from 6 to 40, with particular preference from 7 to 30, and in particular from 8 to 25 μm, and in the case of the clearcoats they are from 10 to 100, preferably from 15 to 80, with particular preference from 20 to 70, and in particular from 25 to 60 μm.

Where electrodeposition films and primer-surfacer films are also used, their thicknesses are, in the case of the electrodeposition coating, from 5 to 50, preferably from 6 to 45, with particular preference from 7 to 40, and in particular from 8 to 35 μm, and, in the case of the primer-surfacer coating, from 10 to 150, preferably from 10 to 120, with particular preference from 10 to 100, and in particular from 10 to 90 μm.

Curing may take place after a certain rest period. This period may have a duration of from 30 s to 2 h, preferably from 1 min to 1 h, and in particular from 1 min to 30 min. The rest period is used, for example, for leveling and devolatilization of the applied films or for the evaporation of volatile constituents such as solvent or water. The rest period may be shortened and/or assisted by the use of elevated temperatures up to 80° C., provided this does not entail any damage or alteration to the applied films, such as premature complete crosslinking.

The thermal curing has no special features in terms of its methodology but instead takes place in accordance with the customary and known methods such as heating in a forced air oven or irradiation with IR lamps. Curing may also be carried out in stages. In accordance with the invention, it is effected at temperatures from 60 to 180° C., preferably for a time of from 1 min up to 2 h, with particular preference from 2 min up to 1 h, and in particular from 3 min to 30 min.

The curing with actinic radiation also has no special features in terms of its methodology but instead takes place with the aid of electromagnetic radiation such as near infrared, visible light, UV radiation or X-rays, especially UV radiation, and/or corpuscular radiation such as electron beams. Preference is given to employing UV radiation.

In the case of electron beams, it is preferred to operate under an inert gas atmosphere. This can be ensured, for example, by supplying carbon dioxide and/or nitrogen directly to the surface of the applied films. In the case of curing with UV radiation, as well, it is also possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. Further examples of suitable beam sources are described in the German patent application DE 198 18 735 A1, column 10 lines 31 to 61. The arrangement of such sources is known in principle and may be adapted to the circumstances of the workpiece and the process parameters. In the case of workpieces of complex shape such as automobile bodies, those regions not accessible to direct radiation (shadow regions) such as cavities, folds and other structural undercuts may be cured using point, small-area or all-round emitters, in conjunction with an automatic movement means for the irradiation of cavities or edges.

The equipment and conditions for these curing methods are described, for example, in R. Holmes, U. V. and E. B. Curing Formulations for Printing Inks, Coatings and Paints, SITA Technology, Academic Press, London, United Kingdom, 1984.

The cure may be effected in stages, i.e., by multiple exposure to light or actinic radiation. This may also be done alternatingly, i.e., by curing in alternation with UV radiation and electron beams, for example.

Thermal curing and curing with actinic radiation may be employed simultaneously or in alternation. Where the two curing methods are used in alternation it is possible, for example, to commence with actinic radiation curing and end with thermal curing. In other cases, it may found advantageous to commence and to end with actinic radiation curing. The skilled worker is able to determine the curing method which is most advantageous for the particular case in hand, on the basis of his or her general knowledge of the art, with the assistance if appropriate of simple preliminary tests.

The single-coat and multicoat effect coating systems of the invention produced from the coating materials of the invention, especially the multicoat effect coating systems of the invention, possess overall the quality required for use in automotive OEM finishing. Accordingly, their optical properties (appearance) such as
  gloss,
  distinctness of image (DOI),
  hiding power,
  precise dichroic optical effects;
their mechanical properties such as
  hardness,
  scratch resistance,
  Abrasion resistance and
  impact resistance;
their adhesion properties such as
  intercoat adhesion and
  adhesion to the substrate;
and their chemical properties such as
  weathering stability,
  UV resistance,
  resistance to blushing,
  etch resistance and
  resistance to chemicals (especially acids and bases), solvents, tree resin, bird droppings and gasoline
are at a sufficiently high level that they are suitable, inter alia, for the finishing of particularly high-value, top-class automobiles.

In particular, however, they are notable for outstanding uniformity of shade over the painted area and exhibit only very few, if any, light/dark shading or clouds, which even if present are barely visible.

Surprisingly, there is also an improvement in the metallic effect in the multicoat color and/or effect coating systems. Moreover, an increase is achieved in the gassing stability of the aluminum effect pigments in the coating materials. Furthermore, the basecoats of the invention in the multicoat systems of the invention are of better compatibility with thin clearcoats. In other words, the basecoats of the invention contain only a very small proportion, if any, of aluminum effect pigments standing vertically with respect to the surface, which may penetrate thin clearcoats and so lead to the development of nibs.

Overall, owing to the inventive use of the neutralized fatty acid mixture, the result is a very much broader applicability of unchromated aluminum effect pigments.

EXAMPLES AND COMPARATIVE EXPERIMENTS

Preparation Example 1

The Preparation of an Aqueous Polyurethane Dispersion 716.6 parts by weight of a condensation product (number average molecular weight: 1410) made from 1.81 mol of a polymeric fatty acid (dimer content at least 98% by weight, trimer content not more than 2.0% by weight, monomer content not more than traces), 0.82 mol or isophthalic acid, 0.61 mol of hexanediol and 0.61 mol of neopentyl glycol, 61 parts by weight of dimethylolpropionic acid, 10.6 parts by weight of neopentyl glycol, 365 parts by weight of methyl ethyl ketone and 308.3 parts by weight of m-tetramethylxylylidene diisocyanate were heated to 80° C. in an appropriate reaction vessel under a nitrogen atmosphere and with stirring. The reaction was continued until the isocyanate content was 1.1% by weight, based on the overall amount of the reaction mixture. Subsequently, 52.6 parts by weight of trimethylolpropane were added, after which the resulting reaction mixture was stirred at 80° C. until free isocyanate groups were no longer detectable. Thereafter, slowly, 33 parts by weight of dimethylethanolamine, 255 parts by weight of butyl glycol and, subsequently, 2153 parts by weight of deionized water were introduced with stirring. The methyl ethyl ketone was distilled off under reduced pressure. This gave a fine dispersion whose pH was adjusted to 7.4 using dimethylethanolamine and whose nonvolatile fraction was adjusted to 31% by weight using deionized water.

Preparation Example 2

The Preparation of an Aqueous Polyester Resin Solution 729 parts by weight of neopentyl glycol, 768 parts by weight of hexanediol, 462 parts by weight of a hexahydrophthalic anhydride and 1710 parts by weight of a polymeric fatty acid (dimer content at least 98% by weight, trimer content not more than 2% by weight, monomer content not more than traces) were weighed out into a reactor, equipped with stirrer, thermometer and packed column, and melted. The resulting melt was heated with stirring such that the overhead column temperature did not exceed 100 degrees Celsius. Esterification was carried out at a maximum of 220° C. until an acid number of 9 was reached. After the reaction mixture had been cooled to 180° C., 768 parts by weight of trimellitic anhydride were added and esterification was continued until an acid number of 32 was reached. Thereafter, the reaction mixture was cooled to 120 degrees Celsius and diluted with 1392 parts by weight of butyl glycol. After the diluted mixture had been cooled to 90° C., 158 parts by weight of dimethylethanolamine were introduced slowly with stirring, followed by 1150 parts by weight of deionized water. The resulting polyester resin solution was adjusted to a pH of 7.6 using dimethylethanolamine and to a nonvolatile fraction of 60% by weight using deionized water.

Preparation Example 3

The Preparation of a Polyurethane Modified Polyacrylate Resin 500 parts by weight of a condensation product (number average molecular weight: 1423) made from 1.0 mol of a polymeric fatty acid. (dimer content at least 98% by weight, trimer content not more than 2.0% by weight, monomer content not more than traces), 1.5 mol of isophthalic acid, 1.6 mol of neopentyl glycol and 1.7 mol of hexanediol, 31.2 parts by weight of neopentyl glycol, 185 parts by weight of methyl ethyl ketone, 201.7 parts by weight of m-tetramethyl-xylylidene diisocyanate and 0.7 part by weight of dibutyltin dilaurate were heated to 80° C. under a nitrogen atmosphere and with stirring. The reaction was continued until the isocyanate content was 1.3% by weight, based on the overall amount of the reaction mixture. Thereafter, 30 parts by weight of diethanolamine were added and the resulting reaction mixture was stirred at 80° C. until isocyanate groups were no longer detectable. Subsequently, 466 parts by weight of butyl glycol were introduced with stirring, after which the methyl ethyl ketone was distilled off under reduced pressure. The resulting polyurethane solution was subsequently adjusted to a nonvolatile fraction of 60% by weight using butyl glycol.

A steel vessel equipped with monomer feed, initiator feed, thermometer, oil heating and reflux condenser was charged with 28.44 parts by weight of butyl glycol and 24.24 parts by weight of the abovementioned polyurethane solution and this initial charge was heated to 110° C. Then a solution of 5.1 parts by weight of t-butyl perethylhexanoate in 6.0 parts by weight of butyl glycol was added uniformly at a rate such that the addition was at an end after 5.5 hours. Simultaneous with the commencement of the initiator addition was the commencement of the addition of a mixture of 18.36 parts by weight of n-butyl methacrylate, 17 parts by weight of methyl methacrylate, 17 parts by weight of lauryl methacrylate, 17.34 parts by weight of hydroxypropyl acrylate and 12.75 parts by weight of styrene. The monomer mixture was added uniformly at a rate such that the addition was at an end in five hours. After all of the initiator solution had been added, the reaction mixture was held at 110° C. for one hour more.

Subsequently, a solution of 1.17 parts by weight of t-butyl perethylhexanoate in 3.5 parts by weight of butyl glycol was added uniformly at a rate such that the addition was at an end after 1.5 hours. Simultaneous with the commencement of the addition of the initiator solution was the commencement of the addition of a mixture of 5.85 parts by weight of acrylic acid and 4.65 parts by weight of n-butyl methacrylate, 2.94 parts by weight of methyl methacrylate, 5.90 parts by weight of lauryl methacrylate, 1.25 parts by weight of hydroxypropyl acrylate and 2.94 parts by weight of styrene. The monomer mixture was added uniformly at a rate such that the addition was at an end within an hour. Thereafter, the temperature of the reaction mixture was held at 110° C. for 1.5 hours more. The resulting resin solution was concentrated to a solids content of 80% by weight by distillation under reduced pressure and neutralized to a degree of 80% using dimethylethanolamine at this temperature over the course of 30 minutes. The resin solution was cooled to 60° C., after which the heating was switched off. Subsequently, water was added slowly until the solids content of the dispersion was 40% by weight. The dispersion had an acid number of 36.7 mg KOH/g and a pH of 7.6.

Preparation Example 4

The Preparation of an Effect Pigment Dispersion (I) (Noninventive)

The dispersion (I) was prepared by mixing 3.0 parts by weight of the commercial aluminum effect pigment Alu-Stapa Hydrolux® VP 51284/G6, 1.8 parts by weight of the commercial aluminum effect pigment Alu-Stapa Hydrolux® 2154 (both from Eckart), 6.0 parts by weight of butyl glycol, and 2.1 parts by weight of the polyester resin solution from preparation example 2.

Preparation Example 5

The Preparation of a Neutralized Fatty Acid Mixture for Inventive Use 7.5 parts by weight of palmitic acid, 7.5 parts by weight of stearic acid, and 1.7 parts by weight of oleic acid were dissolved at from 35 to 60° C. in 75 parts by weight of a mixture of Solventnaphtha® and butyl glycol in a ratio of 3:1 and the mixture was neutralized with 9.5 parts by weight of di-n-butylamine, corresponding to 1.1 equivalents of base per equivalent of acid.

Preparation Example 6

The Preparation of an Effect Pigment Dispersion (I) for Inventive Use

The dispersion (I) was prepared by mixing 3.0 parts by weight of the commercial aluminum effect pigment Alu-Stapa Hydrolux® VP 51284/G6, 1.8 parts by weight of the commercial aluminum effect pigment Alu-Stapa Hydrolux® 2154 (both from Eckart), 4.0 parts by weight of butyl glycol, 4.0 parts by weight of isopropanol, 0.2 part by weight of the neutralized fatty acid mixture from preparation example 5, and 2.1 parts by weight of the polyester resin solution from preparation example 2.

Example 1 and Comparative Experiment C1

The Preparation of an Inventive (Example 1) and of a Noninventive (Comparative Experiment C1) Aqueous Basecoat Material The inventive and noninventive aqueous basecoat materials were prepared by mixing the starting products indicated in table 1 in the sequence indicated.

TABLE 1

The material composition of the inventive (example 1) and noninventive (comparative experiment C1) aqueous basecoat materials

| Starting product | Example 1 | Comparative exp. C1 |
|---|---|---|
| 1st thickener (3 percent phyllosilicate, Laponite ®) | 27.2 | 27.2 |
| Polyurethane dispersion from preparation example 1 | 22.1 | 22.1 |
| Polyester resin solution from preparation example 2 | 2.0 | 2.0 |
| Polyurethane modified polyacrylate resin from preparation example 3 | 3.9 | 3.9 |
| Butyl glycol | 2.5 | 2.5 |
| Commercial (mixed methyl/butyl etherified) melamine resin in butanol (Maprenal ® VMF 3924 from Hoechst) | 4.2 | 4.2 |
| Dimethylethanolamine, 10% strength in water | 0.4 | 0.4 |
| 2-Ethyl-1-hexanol | 2.0 | 2.8 |
| Deionized water | 10.0 | 10.0 |
| 2nd thickener (thickener based on polyurethane; Nopco ® DSX 1550, 50% strength in butyl glycol; from Henkel) | 1.4 | 1.4 |
| Deionized water | 6.0 | 6.0 |
| Isopropanol | — | 3.0 |
| Butylene glycol | 3.0 | — |
| Dispersion (I) from preparation example 4 | — | 12.9 |
| Dispersion (I) from preparation example 6 | 13.1 | — |

The aqueous basecoat materials were adjusted to a viscosity of from 70 to 90 mPas in a shear field of 1000 s$^{-1}$.

The gassing stability of the aqueous basecoat materials was tested as follows:

300 g of each of the aqueous basecoat materials from comparative experiment C1 and from example 1 were introduced into gas washing bottles and heated to 40° C. The gas washing bottles were sealed with water-filled, 25 ml gas bubble counters and stored in a water bath at 40° C. for 30 days. Following this period, the volume of water displaced by the gas formed was measured. In the case of comparative experiment C1, the volume was from 6 to 8 ml; in the case of example 1, it was 3 ml. Accordingly, the inventive aqueous basecoat material of example 1 had a significantly higher gassing stability than the aqueous basecoat material of comparative experiment C1.

Example 2 and Comparative Experiment C2

The production of an Inventive (Example 2) and of a Noninventive (Comparative Experiment C2) Multicoat Effect Coating System For example 2, the aqueous basecoat material from example 1 was used.

For comparative experiment C2, the aqueous basecoat material from comparative experiment C1 was used.

To test the performance properties of the aqueous basecoat materials, test panels measuring 30×70 cm were prepared in a customary and known manner. To this end, steel panels (body panels) which had been coated with a customary and known, cathodic electrodeposition coat, and baked, were coated with a commercial primer-surfacer from BASF Coatings AG, after which the resulting primer-surfacer film was flashed off at 20° C. and a relative atmospheric humidity of 65% for five minutes and baked at 140° C. in a forced air oven for 30 minutes.

After the cooling of the test panels to 20° C., the aqueous basecoat materials were applied in two spray passes. The first application was carried out by means of ESTA (bell speed: 45,000 rpm; directing air: 120 l/min [stp]; voltage: 65 kV; distance: 0.25 m; paint outflow volume: 170 ml/min), corresponding to a dry film thickness of 8 to 10 μm. The second application is made pneumatically (distance: 0.32 m; paint outflow volume: 540 ml/min; atomizer air volume: 300 l/min [stp]; atomizer air pressure: 4.8 bar; horn air pressure: 5.2 bar; horn air volume: 395 l/min [stp]), corresponding to a dry film thickness of from 4 to 6 μm. The aqueous basecoat films were flashed off for two minutes each following the first and second applications.

After application, the aqueous basecoat films were dried at 80° C. for 15 minutes, cooled and overcoated with a commercial two-component clearcoat material from BASF Coatings AG. Thereafter, the aqueous basecoat films and the clearcoat films were baked at 130° C. for 30 minutes, giving the inventive multicoat system of example 2 and the noninventive multicoat system of comparative experiment C2.

The test panels were assessed visually for light/dark shading (clouds) under diffuse light from a distance of 2 to 3 m in straight-on view (80°) and in oblique view (40°) and the results scored (1: no visible clouds to 5: clouds very clearly visible).

A standard commercial calorimeter was used to measure the lightness values (MFD) at different angles. The MFD is the unit of metallic effect (flop).

The results obtained were as follows:

Example 2

Clouds (straight-on): 2; clouds (oblique): 3; MFD: 77

Comparative Experiment C1

Clouds (straight-on): 3; clouds (oblique): 5; MFD: 69

Accordingly, the aqueous basecoat of example 2 showed significantly less light/dark shading and better flop than the aqueous basecoat of comparative experiment C2
and with only a comparatively minor modification of the composition of the inventive aqueous basecoat material in relation to the prior art.

When, in the case of example 1 and comparative experiment C2, the clearcoat materials were applied in the form of a wedge of increasing film thickness, a further key difference was found between the inventive multicoat system of example 2 and the multicoat system of comparative experiment C2. Whereas the multicoat system of the comparative experiment C2 had distinctly visible nibs in the region of the thin clearcoats (25 to 35 μm) of the wedge, this was not the case with the inventive multicoat system of example 2. The reason for this was that the basecoat of the inventive multicoat system of example 2 contained very few if any aluminum effect pigment particles standing vertically with respect to the plane of the coating. Such particles, standing vertically, are known to be the cause of nibs. Accordingly, the inventive multicoat system of example 1 was markedly superior in appearance to the noninventive multicoat system of comparative experiment C2.

What is claimed is:

1. An aqueous effect coating material comprising at least one water soluble or dispersible binder,
    at least one effect pigment, and
        a neutralized mixture of at least two fatty acids selected from the group consisting of fatty acids having 6 to 30 carbon atoms in the molecule, comprising from 1 to 6 percent by weight of the neutralized mixture of at least two fatty acids, based on the weight of the effect pigment, wherein an excess of neutralizing agent is employed for the neutralized mixture of at least two fatty acids and wherein the neutralizing agent is selected from the group consisting of ammonia, trimethylamine, triethylamine, tributylamine, amino alcohols, dibutylamine, dimethylaniline, diethylaniline, triphenylamine, dimethylethanolamine, diethylethyanolamine, methyldiethanolamine, 2-aminomethylpropanol, dimethylisopropylamine, dimethylisopropanolamine, triethanolamine, and combinations thereof.

2. The coating material as claimed in claim 1, wherein the at least one effect pigment comprises at least one metallic effect pigment.

3. The coating material as claimed in claim 1, wherein the at least one effect pigment comprises at least one aluminum effect pigment.

4. The coating material as claimed in claim 3, wherein the at least one aluminum effect pigment is selected from the group consisting of nonleafing pigments.

5. The coating material as claimed in claim 3, wherein the aluminum effect pigment or pigments are selected from the group consisting of aluminum effect pigments having a substantially circular form and aluminum effect pigments having a substantially elongate form.

6. The coating material as claimed in claim 3, wherein the at least one aluminum effect pigment is selected from the group consisting of leafing pigments.

7. The coating material as claimed in claim 1, wherein at least two fatty acids selected from the group consisting of caproic acid, enanthic acid, caprylic acid, pelargonic acid, capric acid, undecylic acid, lauric acid, myristic acid, palmitic acid, stearic acid, oleic acid, elaidic acid, arachidic acid, behenic acid, lignoceric acid, cerotic acid, and melissic acid are used.

8. The coating material as claimed in claim 1, wherein the water soluble or dispersible binder or binders are selected from the group consisting of polyurethanes, polyesters, and polyurethane modified (meth)acrylate copolymers.

9. A process for preparing a coaxing material as claimed in claim 1, which comprises
    (I) dispersing the effect pigment or pigments in a mixture comprising
        at least one water miscible organic solvent,
        at least one water soluble or dispersible binder, and
        the neutralized mixture of at least two fatty acids;
    (II) combining the resulting dispersion (I) with an aqueous solution or dispersion of at least one water soluble or dispersible binder.

10. A method of coating with a coating material as claimed in claim 1, comprising applying the coating material of claim 1 to a substrate selected from the group consisting of automotive substrates, interior and exterior constructions, doors, windows, furniture, industrial substrates, coil, containers, and electrical components.

11. The coating material as claimed in claim 1, wherein the neutralized mixture of at least two fatty acids comprises neutralized palmitic, stearic, and oleic acids.

* * * * *